United States Patent [19]

Bynum

[11] Patent Number: 5,083,819
[45] Date of Patent: Jan. 28, 1992

[54] FLUID COUPLING AND FASTENER CAPTURE DEVICE

[75] Inventor: Kurt K. Bynum, Saline, Mich.

[73] Assignee: Moeller Manufacturing Co., Canton, Mich.

[21] Appl. No.: 660,645

[22] Filed: Feb. 25, 1991

[51] Int. Cl.$^5$ .............................................. F16L 55/00
[52] U.S. Cl. ...................................... 285/89; 285/92; 285/315; 411/121
[58] Field of Search ...................... 285/87, 89, 92, 315; 411/119, 120, 121, 941.1

[56] References Cited

U.S. PATENT DOCUMENTS

| | | | |
|---|---|---|---|
| 315,895 | 4/1985 | Brady . | |
| 408,320 | 8/1889 | Powell | 411/121 |
| 1,691,851 | 11/1928 | McCuean | 285/386 |
| 1,914,736 | 6/1933 | Coutu | 285/92 X |
| 2,400,338 | 5/1946 | Cadman | 285/89 |
| 2,489,919 | 11/1949 | Merriman | 151/39 |
| 2,731,058 | 1/1956 | Smisko | 151/39 |
| 2,992,018 | 7/1961 | Rosan | 285/81 |
| 3,069,187 | 12/1962 | Collins et al. | 285/110 |
| 3,343,852 | 9/1967 | Blight et al. | 285/82 |
| 3,986,731 | 10/1976 | Dehoff | 285/81 |
| 4,150,845 | 4/1979 | Riuli et al. | 285/81 |
| 4,801,160 | 1/1989 | Barrington | 285/81 |

Primary Examiner—Dave W. Arola
Attorney, Agent, or Firm—James M. Deimen

[57] ABSTRACT

A new capture device comprising a plurality of axially extending tangs on one of a pair of complementary fittings in a fluid coupling and a polygonal circumferential groove on the other fitting adapted to engage the tangs. Upon rotational engagement of the fittings the tangs engage the polygonal groove and "ratchet" about the junctures between the flats until the coupling is tight. Although not limited to particular materials, the new capture device is particularly suited to very tough, strong and hard materials such as titanium, stainless steel and inconel alloy because the effectiveness of the capture device is dependent upon the stiffness of the tangs. The new device prevents vibrational disassembly of the complementary fittings without preventing disassembly solely with wrenches. Moreover, the complementary fittings and capture device can be repeatedly assembled and disassembled without any damage to the threads or capture device.

14 Claims, 2 Drawing Sheets

FLUID COUPLING AND FASTENER CAPTURE DEVICE

BACKGROUND OF THE INVENTION

The field of the invention pertains to fluid tubing couplers and fasteners and, in particular, to fasteners for hydraulic, pneumatic and fuel systems on aircraft wherein unusual and perhaps "exotic" materials are used for weight savings and corrosion resistance. Such fittings are subject to severe vibration and absolutely must not loosen or disassemble during use. As a result military and civilian specifications require assurance that failure will not occur. Conventional construction now requires that the fittings be "wired" and the wires "sealed" to prevent the fasteners from rotating apart during use.

An early patent, U.S. Pat. No. 315,895, discloses a device to retain a packing nut on a valve. The device engages the flats on the nut and is retained by a small screw. U.S. Pat. No. 1,691,851 and more recently U.S. Pat. No. 4,801,160 each disclose a circumferential coil spring having means at one end of the coil spring to engage a ratchet or socket in the member that is to be prevented from rotating.

U.S. Pat. No. 3,343,852 discloses a ball detent device to lock a nut on an electrical connector. The ball detent engages a plurality of grooves in an inside member. U.S. Pat. No. 3,986,731 discloses a tangentially extending external pawl that engages notches in the exterior of the inside member whereas U.S. Pat. No. 3,069,187 discloses an axially extending pawl adapted to engage a plurality of ratchet grooves in the radial face of the other member. Similarly, U.S. Pat. No. 2,489,919, U.S. Pat. No. 2,731,058 and U.S. Pat. No. 4,150,845 all disclose devices that engage ratchet grooves in a radial face on one of the members. U.S. Pat. No. 2,992,018 discloses a circumferential plurality of axial grooves on an inner member and a circumferential plurality of axial grooves on the inside of a nut as axially extended. Splits in the axially extended portion of the nut permit the grooved portion to flexibly expand and ratchet about the inner member.

Most of the devices disclosed above are bulky and complicated with several separate parts or require a complicated geometry be formed on one or both of the members retained to prevent retrograde movement and inadvertent disassembly. Such complications are to be avoided with aircraft couplings and fasteners which are typically formed from expensive, hard, tough and strong metals and alloys. Other common devices rely upon plastic yielding of the threads joining the couplers or fasteners or plastic yielding of a plastic insert. Plastic yielding destroys the reuseability of such capture devices after one or a few disassemblies. With a view toward creating a light, compact and simple capture device that can be retrofitted to existing couplings, applicant has developed the new capture device disclosed below.

SUMMARY OF THE INVENTION

The new capture device for fluid fittings and couplings comprises an inside threaded or female fitting formed with an external plurality of flats about the circumference and an outside threaded or male fitting fitted with an external circumferential ring having a plurality of axially parallel tangs adapted to engage the plurality of flats.

The plurality of flats on the female fitting are radially spaced from the axis of the female fitting a distance less than the external radius of the outside of the female fitting between the flats and the engageable end of the female fitting thereby forming a circumferential shoulder adjacent the circumferential plurality of flats.

The male fitting plurality of tangs are spaced radially from the external threads. The tang ring is fitted against a flange on the male fitting. The ring may be one piece and press fit onto a shoulder of greater radius than the external threads or, in particular for retro-fit combinations, the ring is split to fit into an existing thread relief groove in the male fitting. In the retro-fit construction a retaining ring or sleeve is press fit over the split ring. A groove or shoulder is formed in the one piece ring or the sleeve for purposes of disassembly if necessary.

In the particular application for which this capture device was developed, severe vibration and temperatures to about 1000° F. are typically and normally encountered. The new capture device does not engage the threads on the fittings and does not rely on any plastic yielding. Rather, the flexing of the tangs is well within the yield strength of the material. Testing of the capture device shows no degradation of the threads on the fittings, the functional engagement surfaces of the capture device or the flexing tangs over hundreds of cycles of assembly and disassembly of the fittings.

The engagement or disengagement of the fittings and capture device requires no additional tools beyond the two wrenches for the fittings. The torque required to activate the capture device is significantly less than the specified torque for seating the fully engaged complementary fittings. Thus, a false full torque does not occur. The torsional resistance of the capture device is sufficient to prevent vibrational loosening and thermal cycling loosening of the fittings. Moreover, the shoulder acts as a fail safe check against any disassembly of the fittings so long as at least one tang remains unbroken. This capability is very important in aircraft applications.

Although described above in terms of a specific male and female complementary coupling pair, the male and female fittings may be reversed relative to the capture device with the circumferential polygonal flats and shoulder formed on the male fitting and the tangs on the female fitting. Nor is the capture device limited only to the threaded coupling pair disclosed below but the device is also applicable to other types of fittings and fasteners that include relative rotational motion to fully engage.

DESCRIPTION OF THE PREFERRED EMBODIMENTS

Figure 1:
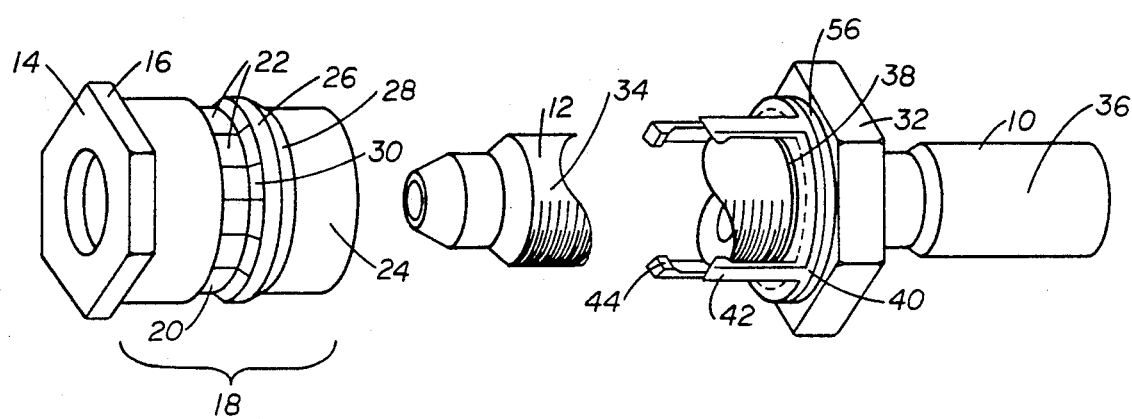
FIG. 1 is an exploded view of the capture device on modified complementary fluid fittings.

Illustrated in FIG. 1 is an exploded view of a fluid coupling comprising a coupling fitting 10 having a threaded male portion 12 and a coupling fitting or a nut with an internally threaded female portion 14. The fitting 10 and nut 14 are permanently attached to lengths of tubing (not shown) in a conventional manner that allows the nut to be rotated relative to the fitting and relative to the tubing entering the nut. Thus, the nut 14 can be screwed on and off the fitting 10.

The nut 14 includes a hexagonal portion 16 for attachment of a wrench and a generally cylindrical portion 18 within which are the internal threads (not shown). Intermediate the length of the cylindrical portion 18 is a circumferential groove 20 or depressed portion formed with a plurality of flats 22 to create a polygonal surface in the groove 20 about the nut. Between the inner end 24 of the nut 14 and the groove 20 is a shoulder 26 having a sloping or bevelled surface 28 facing the inner end 24 and a second bevelled but also flatted surface 30 facing and forming a part of the groove 20. The inner end 24 of the cylindrical portion 18 is of smaller diameter than the portion 19 adjacent the hexagonal portion 16. Although the nut 14 may be formed of other materials for other purposes, the particular application for which the improvements disclosed herein apply require a very hard, tough and strong material such as titanium. As an alternative, to retro-fit an existing nut of relatively soft material, a separate collar or sleeve incorporating the polygonal surface 20 and adjacent bevelled shoulder 30 and made of suitable hard, tough, strong material may be press fit over a smooth generally cylindrical portion corresponding to 18.

Figure 3:
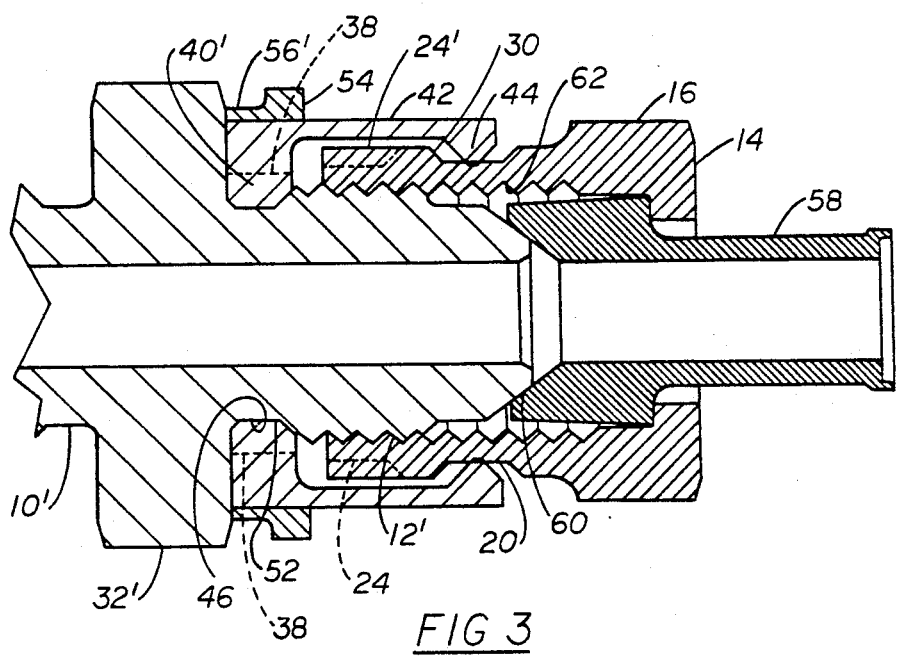
FIG. 3 is a side cross-section of the capture device retro-fitted to the complementary fluid fittings.

In a similar manner the fitting 10 may be formed of other materials for other purposes, but here the particular application requires very hard, tough and strong material such as Inconel alloy, a product of Inco, Inc. (The International Nickel Company). The fitting 10 includes a hexagonal portion 32 for attachment of a wrench with generally cylindrical portions 34 and 36 extending axially to either side of the hexagonal portion 32. The cylindrical portion 34 includes the threaded male portion 12 and a cylindrical shoulder 38 between the threaded portion and the hexagonal portion 32. (Also shown in FIG. 3 is the location of the cylindrical shoulder 38).

Press fit circumferentially about the cylindrical shoulder 38 is a ring 40 having a plurality of axially extending tangs 42 integrally attached to the ring. Each tang 42 is formed with a radially inward directed knob 44. As is more fully disclosed and explained below the knobs 44 on the ends of the tangs 42 are adapted to engage the polygonal groove flats 22 on the nut 14 when the nut 14 and fitting 10 are engaged tightly. On relatively small fittings and capture devices the flats 22 may be slightly concave to emphasize the junctures between the flats and provide better capture of the knobs 44. On larger fittings the concavity has not been found of particular advantage.

Figure 2:
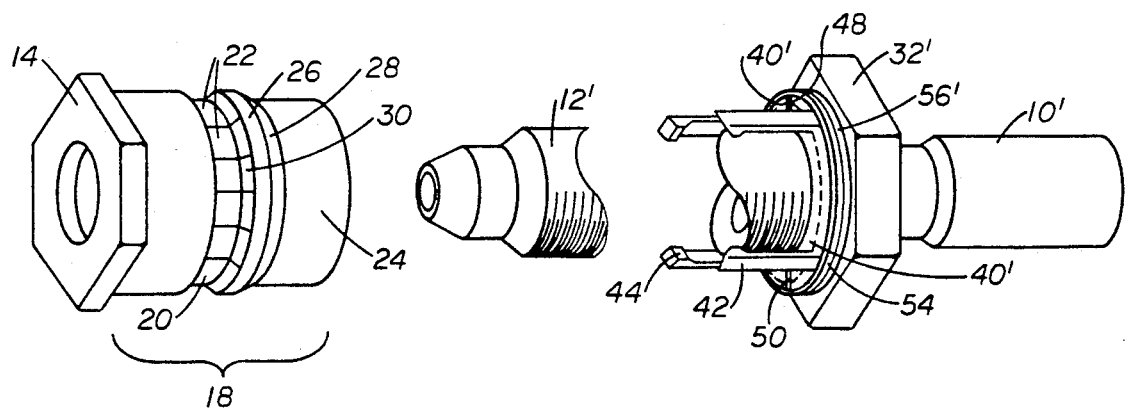
FIG. 2 is an exploded view of the capture device retro-fitted to complementary fluid fittings.

In FIG. 2 the nut 14 remains substantially the same in FIG. 1, however, the capture device is modified to permit retrofit to Inconel fittings 10' currently in use. Referring also to FIG. 3, the fitting 10' includes a relief groove 46 between the hexagonal portion 32' and the threaded portion 12'. To retrofit attach the capture device to the fitting 10', the ring 40' is split at 48 and 50 and modified to fit down into the relief groove 46 as shown at 52. A circumferential retaining ring or sleeve 54 is press fit over the ring 40' to retain the ring halves in tight engagement with the relief groove 46. As above a plurality of tangs 42 extend axially from the ring 40' and are formed with radially inwardly directed knobs 44.

To assist in the removal of the capture device when necessary, a circumferential groove 56' is formed in the exterior of the sleeve 54. In a similar manner an exterior circumferential groove 56 is formed in the ring 40 shown in FIG. 1.

As best shown in FIG. 3 the nut 14' engages a tubing ferrule 58 which in turn is tightly engaged to the fitting 10' at a conical juncture 60 in a conventional manner. The inner end 24' of the nut 14' in FIG. 3 is of the same diameter as the portion 19 and therefore the shoulder 26 and bevel 28 do not separately appear as in FIGS. 1 and 2. The bevel flats 30, however, are formed in the sidewall of the groove 20.

In tightening the nut 14' and ferrule 58 to the fitting 10' the male 12' and female 62 threads are rotatably engaged. As the nut 14' is engaged to the fitting body 10' as best shown in FIG. 3 the tang knobs 44 engage the inner end 24' of the nut 14' flexing outwardly the tangs 42. In the case of the smaller diameter inner end 24 the nut threads engage the fitting threads 12 prior to engagement of the tang knobs 44 with the bevelled surface 28 and flexing over the shoulder 26. The tangs 42 again flex as the knobs 44 engage and pass over the circumferential bevel 30. The tang knobs 44 drop into the polygonal groove 20 and engage the flats 22 as the nut 14' is finally tightened. The tang knobs 44 engage the flats 22 with an interference fit and therefore, as the nut 14' is rotated, the tangs 42 flex and the knobs 44 "ratchet" over the junctures between the flats 22.

Figure 4A:
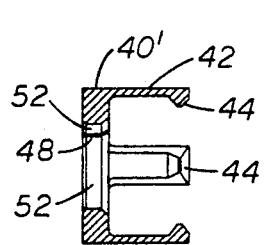
FIGS. 4a and 4b illustrate the separate tang ring of the capture device with FIG. 4a taken along the line 4a—4a in FIG. 4b.
Figure 4B:
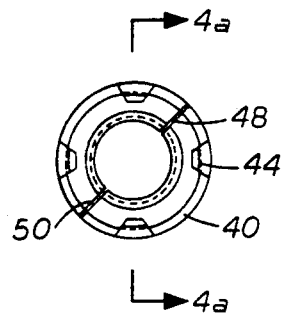
Figure 5A:
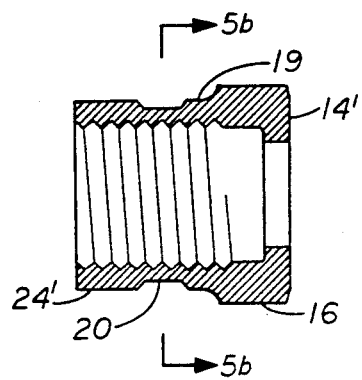
FIGS. 5a and 5b illustrate the nut fitting modified for the capture device with FIG. 5a taken along the line 5a—5a in FIG. 5b and vice versa.
Figure 5B:
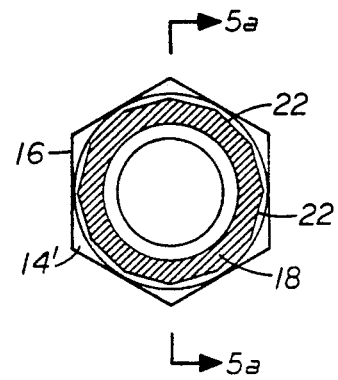

In FIGS. 4a and 4b the capture device split ring 40' and tangs 42 are illustrated separate from the fitting 10 or 10'. In keeping with the titanium nut and Inconel fitting above the split ring 40' and tangs 42 are titanium. In a prototype for test the dimension across the flats of the hexagons 16 and 32 is about three-quarters of an inch and the cylindrical portion 18 of the nut 14 is slightly more than one-half inch in diameter. The interference fit between the tang knobs 44 and the polygonal groove flats 22 is 0.02 inches. The interference fit between the sleeve 54 and the split ring is 0.002 inches. Nevertheless with the high hardness and modulus of elasticity of each of the materials in combination with the configuration of the capture device, the capture device effectively prevents loosening of the nut. In the prototype twelve flats 22 are provided as best shown in FIGS. 5a and 5b wherein the nut 14' is shown separate from the fitting 10 or 10'.

The capture device as above described is made of titanium, however, the tangs and nut fitting need not both be of the same material. Rather, the materials should be compatible for the operating conditions. In particular, the shoulder and groove flats on the nut fitting should be very hard and the tangs very stiff and tough for their size to resist any yielding or permanent set which would reduce the effectiveness of the capture device.

I claim:

1. A capture device comprising means adapted to non-rotatably attach to a portion of a first fitting, a plurality of elongate tangs extending from the attachment means and radially spaced from the axis of the first fitting, a plurality of flats forming a circumferential polygon non-rotatably encircling a second fitting, the second fitting having means adapted to rotatably engage the first fitting, a circumferential shoulder adjacent the circumferential polygon, and means on each tang spaced from the attachment means, said means on each tang radially positioned to contact the circumferential shoulder and adapted to tightly engage the flats on the circumferential polygon whereby engagement of the first and second fittings causes the tangs to flex as the means on each tang pass over the circumferential shoulder adjacent the circumferential polygon and rotational relative motion of the fittings cause the tangs to flex as the means on each tang ratchet over the junctures of the adjoining flats.

2. The capture device of claim 1 wherein the circumferential polygon and adjacent circumferential shoulder are formed into the external surface of a second fitting.

3. The capture device of claim 1 wherein the attachment means comprise a ring, the ring is split radially and a circumferential sleeve engages the split ring to retain the ring on a first fitting.

4. The capture device of claim 3 including removal means formed on the sleeve.

5. The capture device of claim 4 wherein the sleeve removal means comprise an external shoulder thereon.

6. The capture device of claim 3 wherein the split ring is formed to tightly engage a relief groove in a first fitting.

7. The capture device of claim 1 wherein the attachment means comprise a ring and the ring is sized to tightly engage a shoulder formed on a first fitting.

8. The capture device of claim 7 including removal means formed on the ring.

9. The capture device of claim 8 wherein the ring removal means comprises an external shoulder thereon.

10. The capture device of claim 1 wherein the plurality of elongate tangs extend from the attachment means generally parallel to the axis of the first fitting.

11. A retro-fit capture device comprising a split ring adapted to non-rotatably engage a relief groove in a first fluid fitting, a plurality of elongate tangs extending from the ring generally parallel to the axis of the ring and radially spaced from the axis, a plurality of flats forming a circumferential polygon non-rotatably encircling a second fluid fitting, the second fluid fitting having means adapted to rotatably engage the first fluid fitting and a circumferential shoulder adjacent the circumferential polygon, means on each tang spaced from the split ring, said means on each tang radially positioned to contact the circumferential shoulder and adapted to tighly engage the flats on the circumferential polygon whereby engagement of the first and second fluid fittings cause the tangs to flex as the means on each tang snap over the circumferential shoulder adjacent the circumferential polygon and, rotational relative motion of the fluid fittings cause the tangs to flex as the means on each tang ratchet over the junctures of the adjoining flats, and a retaining sleeve circumferentially engaged about the split ring to retain the ring in the relief groove.

12. The retro-fit capture device of claim 11 including removal means on the retaining sleeve.

13. A pair of complementary fittings and a capture device comprising a first fitting having a ring shoulder formed thereon, a ring in non-rotatable tight engagement with the ring shoulder and a plurality of elongate tangs extending from the ring generally parallel to the axis of the fitting and radially spaced therefrom, a second fitting having a plurality of flats forming a non-rotatable circumferential polygon there about, the second fitting having means to rotatably engage the first fitting, a circumferential shoulder on the second fitting and adjacent the circumferential polygon, and means on each tang spaced from the ring, said means on each tang radially positioned to contact the circumferential shoulder and adapted to tightly engage the flats on the circumferential polygon whereby engagement of the first and second fittings causes the tangs to flex as the means on each tang pass over the circumferential shoulder adjacent the circumferential polygon and, rotational relative motion of the fittings cause the tangs to flex as the means on each tang ratchet over the junctures of the adjoining flats.

14. The complementary fittings and capture device of claim 13 including a flange adjacent the ring shoulder, the ring being press fit on the ring shoulder and engaging the flange.

* * * * *